(12) United States Patent
Nunn et al.

(10) Patent No.: US 11,257,047 B2
(45) Date of Patent: Feb. 22, 2022

(54) METHOD AND SYSTEM OF PROCESSING WASTE FABRICS TO REJUVENATED FIBROUS MATERIALS

(71) Applicant: PSIL Holdings LLC, Tulsa, OK (US)

(72) Inventors: Kayren Joy Nunn, Bixby, OK (US); Susan Hughes Brown, Bixby, OK (US)

(*) Notice: Subject to any disclaimer, the term of this patent is extended or adjusted under 35 U.S.C. 154(b) by 118 days.

(21) Appl. No.: 14/672,136

(22) Filed: Mar. 28, 2015

(65) Prior Publication Data
US 2016/0283917 A1    Sep. 29, 2016

(51) Int. Cl.
*B09B 5/00* (2006.01)
*D01G 11/04* (2006.01)
*G06Q 10/00* (2012.01)

(52) U.S. Cl.
CPC .............. *G06Q 10/30* (2013.01); *B09B 5/00* (2013.01); *D01G 11/04* (2013.01); *Y02W 90/20* (2015.05)

(58) Field of Classification Search
CPC .......... G06Q 10/30; B09B 5/00; Y02W 90/20
See application file for complete search history.

(56) References Cited

U.S. PATENT DOCUMENTS

| | | | |
|---|---|---|---|
| 5,331,801 A | | 7/1994 | Heifetz |
| 5,531,796 A | * | 7/1996 | Wasinger ............. D06L 1/14 8/102 |
| 6,378,179 B1 | * | 4/2002 | Hirsch ................ D04H 1/4274 19/107 |
| 2011/0250425 A1 | * | 10/2011 | Lightman ............ D01G 11/00 428/221 |
| 2013/0192189 A1 | | 8/2013 | Lawrence |

FOREIGN PATENT DOCUMENTS

DE    3138653    1/1980

OTHER PUBLICATIONS http://www.glatfelter.com/sustainability/commitment/recycled_fiber.aspx.

* cited by examiner

*Primary Examiner* — Amina S Khan

(57) ABSTRACT

The present invention discloses a method and corresponding system of processing waste fabrics to rejuvenated fibrous materials that will maintain their original quality in downstream production without a loss of downstream manufacturing efficiencies. The method involves (a) obtaining fabric data for each bale of incoming waste fabrics and storing the fabric data in a database; (b) obtaining target data relating to target product requirements; (c) processing the fabric data and the target data according to predetermined algorithms to generate a rejuvenation processing recipe which specifies bales information and rejuvenation processes information; (d) selecting corresponding bales of incoming waste fabrics for further rejuvenation processing; and (e) subjecting the selected bales to processes specified by the rejuvenation processing recipe.

49 Claims, No Drawings

METHOD AND SYSTEM OF PROCESSING WASTE FABRICS TO REJUVENATED FIBROUS MATERIALS

TECHNICAL FIELD

The present invention generally relates to the recycling of post industrial and pre-consumer materials. In particular, the present invention relates to a method and corresponding system of processing waste fabrics to rejuvenated fibrous materials that will maintain their original quality in downstream production without a loss of downstream manufacturing efficiencies. This allows for a higher quality product that is more sustainable and utilizes hundreds of billions of pounds of waste that would typically be landfilled, incinerated, or downcycled annually.

BACKGROUND ART

The recycling industry has historically considered all textile waste material to be peripheral, relegating it to be swept from cutting tables and mill floors and deposited in bins or baled along with any foreign debris mingled with it. If the scrap were recycled, all of the now indigenous debris would be recycled with it and therefore included in downcycled products where quality criteria are not strictly adhered to.

In the global creation of textile fabrics, costly quality systems are required of the manufacturers. However, once the material is either made into yarn or cut into a pattern, the value of the resulting scrap is significantly depleted. As a result, the complex composition of the fabrics is lost and their unique design criterion becomes disregarded by the manufacturer. Information systems subsequently lose track of the fabric scrap because there has heretofore been no sustainable alternative which would make a difference. Recycling had become a default exercise for some industries that produce toy stuffing, automotive shoddy or carpet underlayment, but has not become a part of the mainstream textile industry because there has not been a scientific answer or an organized methodology to the overall problem. Moreover, the cost of transferring waste to the recycler from the facility which created it proved to be unsustainable and therefore unworthy of consideration. There has been no global upside to waste recycling because waste fibers could never be used in high quality products without loss of efficiencies.

Current recycling practices for practically all materials tend to be high-tech waste management strategies for low quality products. Rather than regaining valuable materials for perpetual reuse in high quality goods, much recycling is actually down cycling, which results in a reduction in the value of material over time.

DISCLOSURE OF THE INVENTION

It is an object of the present invention to provide a rejuvenation method and system that create a cost savings to both the downstream manufacturer and consumer, along with a positive $CO_2$ condition, which offer a technological breakthrough for the environmental community.

It is another object of the present invention to use quality materials at their peak without any loss of efficiency in downstream manufacturing, resulting in the value of the fibers increasing significantly over those of "shoddy" fiber production, which makes this a viable and sustainable business opportunity with benefits not only for the environment, but also for industrial partnerships and consumers.

The method and process for producing high quality rejuvenated textile waste fibers is dependent upon critical data as well as specialty equipment and technologies. This amalgamation becomes evident in the establishment of a rejuvenation process based upon both intuitive and scientific analysis of data and proper science of manufacturing. Furthermore, quality control systems have been instituted which are singular within the industry, as well as unique chemistry and engineered equipment which gently, not aggressively, deconstruct fabrics, reverting them to yarn segments (Pre-Fiberization) and ultimately to individual fibers (Fiber Refinement). Fiber Rejuvenation is a holistic system and, if approached in this manner, can transform what is now a "niche" downcycled market for apparel and industrial textiles into a mainstream sustainable raw material that is equal in quality and costs less than virgin raw material and creates value to the industry and its consumers.

To attain this, the present invention provides a method of processing waste fabrics to rejuvenated fibrous materials, comprising the steps of:

(a) Obtaining fabric data for each bale of incoming waste fabrics and storing the fabric data in a database;

(b) Obtaining target data relating to target product requirements;

(c) Processing the fabric data stored in the database and the target data according to predetermined algorithms to generate a rejuvenation processing recipe which specifies bales information relating to bales of incoming waste fabrics selected for further rejuvenation processing, and rejuvenation processes information relating to a series of processes and corresponding process parameters for each of the series of processes for processing the selected bales of incoming waste fabrics to obtain rejuvenated fibrous materials specific to the target product requirements;

(d) Selecting, according to the bales information of the rejuvenation-processing recipe, corresponding bales of incoming waste fabrics for further rejuvenation processing;

(e) Subjecting the selected bales of incoming waste fabrics to processes specified by the rejuvenation processes information of the rejuvenation-processing recipe to obtain rejuvenated fibrous materials specific to the target product requirements.

The present invention also provides a system of method of processing waste fabrics to rejuvenated fibrous materials, comprising:

(a) means for obtaining fabric data for each bale of incoming waste fabrics;

(b) means for obtaining target data relating to target product requirements;

(c) means for processing the fabric data stored in the database and the target data to generate a rejuvenation processing recipe which specifies bales information relating to bales of incoming waste fabrics selected for further rejuvenation processing, and rejuvenation processes information relating to a series of processes and corresponding process parameters for each of the series of processes for processing the selected bales of incoming waste fabrics to obtain rejuvenated fibrous materials specific to the target product requirements.

BEST MODE FOR CARRYING OUT THE INVENTION

Each of the steps in the method of the present invention is further described below in further details.

Step (a):

The first step is to obtain an exact knowledge of materials content of the incoming waste fabrics. In conventional recycling centers, the raw material source is known only when it arrives at the facility and the origin and details of the material, other than fundamental data, is never deemed necessary since its end use is destined for a lower-end commodity. For example, a recycling center may know that the material it will be processing is denim to be used for automotive shoddy pads, but they do not know from where the denim originated nor do they do know the type of finish it has. Moreover, they do not know if the denim is a blend of cotton/polyester, cotton/rayon, or cotton and lycra because that data is not important to the successful manufacture of their product. Conversely, if that denim was going to be woven into a high-end yarn application in a large textile mill where speed and efficiencies were important, those details would be of prime importance. If polyester was present in the blend that was about to go through the rejuvenation processes as in Step (c) of the method of the present invention, there would be streaking in the ultimate yarn. If there were Lycra fibers, the spinning frames would shut down operation due to a problem that no one could pinpoint. Similarly, if a downstream product is calling for white 100% cotton, non-optic material, it is important to understand the type of bleaching and finishes that have gone on the fabric prior to the material being brought into the facility and staged for the rejuvenation processes.

To attain the above object, the fabric data in Step (a) includes composition of the incoming waste fabric, approximate yarn count of the incoming waste fabric, types of treatments or finishes that the incoming waste fabric have received during production of the incoming waste fabric, and color and shade of the incoming waste fabric. The fabric data could be obtained by conducting laboratory tests to the incoming waste fabrics; the laboratory tests may include but are not limited to one or more of the following: burn test, solubility test, dye staining test, Fourier Transform Infrared spectroscopy, chemical reaction test, burn rate test, elemental analysis, color and shade test, UV spectroscopy imaging and detection. It might also include moisture absorption testing for natural or synthetic fibers. The fabric data will determine what chemicals remove the fabric finishes and prepare them for quality fiberization, the types of needles and needle patterns that will be used to initiate the separation of yarns and the untwisting of the threads and so forth. The fabric data also enables the process to individually manage and control the distinct characteristics of the production of fibers which are colored, natural, bleached white and non-optically brightened, thus resulting in the ability to produce quality dyed fiber without using additional dyes or chemicals adds to the sustainability of their integration in all downstream consumer products, and the ability to segregate quality non-optically brightened fiber from one which has been subjected to chlorine bleaching which is important to many consumers. All of this information is considered critical data and therefore key to the ultimate success of the present invention. The fabric data is all entered and stored into a database of an internal intelligence system, RDS (Rejuvenation Data System) and used to set the intelligence processes in motion.

The bales of incoming waste fabrics contain fibers may include one or a blend of the following: natural fibers from plant or vegetable, animal hairs, metallic fibers, fibers transformed from natural polymers, synthetic fibers, inorganic fibers. The natural fibers from plant or vegetable include but are not limited to cotton, kapok, kupro, flax, linen, silk, hemp, jute, ramie, kenaff, straw, banan, pina, papyrus, alfagras, fique, alginate, urena, nettle, broom, apocynum, raffia, bamboo, sisal, abaca, henequen, phormium, rosella, acacia, aloe, yucca, coconut, and elastodiene. The animal hairs include wool, camel, vicuna, alpaca, llama, mohair, cashmere, horse hair, goat hair, rabbit hair, yak, beaver, chitosan, silk, chiengora, and qiviut. The metallic fibers include gold, silver, aluminized yarns or aluminized plastic yarns. The fibers transformed from natural polymers include but are not limited to viscose, bamboo (regenerated), modal, lyocell, acetate, triacetate, milk protein, PLA, and byssus. The synthetic fibers include but are not limited to polyamides, polyesters, polyurethanes, polyvinyls, polyolefins, polypropylene, copolymers, elastomeric fibers, modacrylics, aramid, paramids, and PBI. The inorganic fibers include but are not limited to as glass fiber, silicic acid glass, carbon, ceramic, steel, inox, copper and basalt. However, it is recognized that it is more cost effective if fabric composition has been predetermined upstream prior to reaching the fiber rejuvenation facility. In that case, the incoming waste fabrics are most effective if they are post-industrial waste fabrics which are sorted preliminarily by fabric color and fabric type but certainly could be post consumer materials, with the importance being that testing would need to occur to determine their composition and finishes once they arrived into the manufacturing facility. In the case of post industrial a lot of knowledge can be obtained directly from the supplier of the incoming waste fabrics but still remains to be verified at the rejuvenation facility for quality purposes.

After obtaining the fabric data and storing the fabric data in the database, the bales of incoming waste fabrics are sorted into batches according to the obtained fabric data, so that appropriate lots may be run simultaneously to ensure greater consistency and quality in their processing. Each sorted batch or bale may weigh from approximately 100 lbs. to 2000 lbs.

Step (b):

Target data relating to target product requirements are obtained from users. Target data may include fabric composition (e.g. 60% cotton and 40% polyester), yarn count, color and shade and so forth. It may also include the types of chemicals and/or fabric finishes that are to be included or excluded; this would be of immense importance for specific applications such as sensitive health or baby care or a downstream yarn/fabric target.

Step (c):

After the target data are obtained from users, the fabric data stored in the database of the intelligence system is processed according to predetermined algorithms to generate a rejuvenation processing recipe which specifies bales information relating to bales of incoming waste fabrics selected for further rejuvenation processing, and rejuvenation processes information relating to a series of processes and corresponding process parameters for each of the series of processes for processing the selected bales of incoming waste fabrics to obtain rejuvenated fibrous materials specific to the target product requirements. It is important to note that as the present invention captures all relevant fabric data of the incoming waste fabrics at the start, it is possible to make maximum use of the incoming waste fabrics. For example, if the target product requires for marl or stock dyed yarns, the present invention may select incoming waste fabrics which have been dyed for further rejuvenation processes so that it would not be necessary to incur additional costs or chemicals for dyeing; if the target product requires white cotton for medical or personal care use, the present invention may select incoming waste fabrics of white color which do not have optical brightening agents applied. An example of the target data and the corresponding bales information of a rejuvenation recipe is as follows:

| Target | Bales information of a rejuvenation processing recipe | | | | | | |
|---|---|---|---|---|---|---|---|
| Data 7 Bales | Bale #1 | Bale #2 | Bale #3 | Bale #4 | Bale #5 | Bale #6 | Bale #7 |
| Weight: 500 lbs each Color: Dark Grey Marl 60/40 Cotton/poly Yarn Count: 30 ct singles or less | Weight: 500 lbs Color: Black 50/50 Cotton/poly Yarn Count: 30 singles | Weight: 500 lbs Color: White 65/35 Cotton/poly Yarn Count: 30 singles | Weight: 500 lbs Color: Black 50/50 Cotton/poly Yarn Count: 24 singles | Weight: 500 lbs Color: Black 90/10 Cotton/poly Yarn Count: 30 singles | Weight: 500 lbs Color: Black 50/50 Cotton/poly Yarn Count: 24 singles | Weight: 500 lbs Color: White 65/35 Cotton/poly Yarn Count: 18 singles | Weight: 500 lbs Color: Black 50/50 Cotton/poly Yarn Count: 30 singles |

Step (d):

After the rejuvenation processing recipe has been determined, the next step is to select, according to the bales information of the rejuvenation processing recipe, corresponding bales of incoming waste fabrics for further rejuvenation processing. As the fabric data of all incoming waste fabrics are stored in the database, the current process involves identifying the bales of incoming waste fabrics with fabric data matching to the bales information, and updating the database after the matching bales of incoming waste fabrics are selected and removed for further rejuvenation processing; such database processing techniques should be obvious in the prior art and so no further details are provided herein.

Step (e):

The selected bales of incoming waste fabrics will then be subjected to processes specified by the rejuvenation processes information of the rejuvenation-processing recipe. The following describes some of the possible processes in detail:

First, opening and simultaneously blending the selected bales of incoming waste fabrics to obtain initially opened and blended fabric pieces. The initially opened and blended fabric pieces are reduced to an appropriate size for conforming to downstream production equipment, and thereafter blended to avoid segregation and to unify composition of the fabric pieces. The size reduction is ideally accomplished using a guillotine-style cutter, although other styles of cutters may perform this function. The goal is for the material to be approximately six to fourteen inches long or six to fourteen inches square at this stage in the process. Once the materials have passed through the size reduction area and become conformed to downstream production equipment, it is important relative to the quality requirements of the method that they are again blended to avoid segregation of color or material type, and to unify the compositions of the fabrics.

Then, cleaning the initially opened and blended fabric pieces to obtain cleaned fabric pieces. In the upstream preparation, residua such as pattern markers or paper will sometimes be found in the folds of the material. As the size of the material begins to be regulated, strings are formed that need to be removed before further processing. Likewise, there is always residual dust, which has been left inside the bales of material that must be removed. These are all lightweight materials that require extraction from the fabric before further processing. The net effect of this procedure is to clean the raw materials from paper, threads and dust which have entered the facility from outside sources, or have been produced in the initial size reduction of the raw materials.

To further control quality, UV light is added to the process to detect foreign chemicals such as optical brighteners and traces of synthetics or color contaminants when they are either undesirable in downstream production or when the application requires a 100% organic product.

The fabric pieces then pass through a subsequent stage to further reduce their size, as it has been important to maintain a relatively large size up to this point in the process. It is now necessary to reduce the fabric pieces to a uniform size of approximately three to six inches square or, if they are rectangular in shape, a maximum length of six inches is considered optimal, based on the type of fiber that will begin to be refined back to a virgin state. This is best performed by a second guillotine cutter, but can be accomplished by any other type cutter providing the blades are kept sharp to keep dust and threads to a minimum during the process.

Once the fabric pieces have been reduced in size, they will be conveyed to the initial Fabric Deconstruction Group for its surfaces to be penetrated by sleeves of industrial needles, which prepares the fabric pieces for an organic bio surface-cleaning step in the process. At this point the materials will be pneumatically suctioned to an intimate blending area and centralized production storage bin.

As the process progresses, a continuous process batch are created and a critical element is initiated, namely, the blending of a complete batch of fabrics which results in the creation of a more harmonious blend of rejuvenated fibers. This is accomplished when a delivery condenser carrying fabric pieces positions itself over a large blending box, which is approximately 10 feet wide and 40 feet long. The delivery condenser moves from right to left over the box dropping the material onto its floor in a z-type pattern until the floor has been covered, and repeats the process until the box has been filled.

The blended fabric pieces are then subjected to cleaning process to remove fabric finishes. Utilization of a semi-dry method of removing these finishes is preferred wherein specific enzymes targeting specific finishes are applied to the fabric pieces in form of vapor and/or spray in such a way that moisture content in the fabric pieces at this stage would not exceed 20%, and as the fabric pieces pass through the rest of the rejuvenation processes, the end result of moisture never exceeds 15% throughout the overall manufacturing process. It is important to target only what is prescribed for removal, thus maintaining the integrity of the materials in the process. Broad-spectrum enzymes used without knowledge of what is specifically on the fabric become nothing more than a guessing game. The utilization of the fabric data which is obtained at the outset of the present invention is therefore critical in making assessments for quality downstream products used in high value applications, especially in the health, baby and personal care marketplace.

By using the semi-dry method, the moisture from the vapor and the chemistry is important to maintain the length and the strength of the fibers that are being processed throughout the system. In rejuvenating cotton fabrics into fiber, it is always important to remove these starches, silicones or other unique finishes which were placed on the fabric during its original manufacture process. Specialized enzymes perform well in this endeavor. In the case of rejuvenating wool fabrics, enzymes would never be used at this stage since they attack the cell membrane of the complex wool fibers and lead to the disintegration of the structure into its component cortical cells. This would lead to holes in the fabric and degradation of the ultimate fiber. Therefore, each particular fiber group is dealt with individually based on the fabric data fed into the RDS internal intelligence system. Fabric groups for this portion of the process will typically be classified within the following:

Cotton
  Cotton blends
  Linen/Hemp/Ramie
  Rayon/Tencel/Lyocell/Modal and Cupro, etc.
  Acetate/Triacetate
  Jute/Kenaf/Sisal/Raffia
  Synthetics such as Polyester or Nylon
  Polypropylene or Olefin fabrics
  Acrylic/Modacrylic
  Natural Hair Collections such as Angora/Vicuna, Camel HairLlama/Mohair/Alpaca/Beaver/Cashmere and Yak, Chiengora, Qiviut
  Aramid, Polyaramids and PBI's
  Rare specialty fibers such as Pina, Banan, Alginate, Kapok, Byssus
  Fabrics made with Bamboo, Soy Protein Fibers, Milk Protein Fibers, PLA, etc.
  Metalized Fabrics
  Fabrics made with elastomeric fibers such as Spandex, Elasterell, Elastoester, and Lastol, etc.
  Polyethylene fabrics
  Silk
  Polyamide
  Blended fabrics will be treated based on the major component from the list above.

The initial cleaning of the fabric is important due to a number of factors relative to both the pre-fiberization process as well as its eventual downstream application. (1) It is important to remove as much of the surface finish as possible to prepare the materials for the deconstruction and pre-fiberization process. This is considered an important part of the purification process. This enables the chemical surface bonds from the fabric finishing, which has occurred upstream to be cleaned from the fabric, and allows for a gentle, non-invasive deconstructive process to begin. (2) In some instances, it is important once the surface bond is broken and cleaning has taken place, that moisture be added as a component into the fiber to strengthen it downstream. (a) In the case of cotton, moisture is important to its preparation since dehydration renders cotton fiber weak and brittle causing it to break and become shorter. If a cotton fiber is made shorter in this process, it will not process efficiently in downstream applications. (b) The compound chemistry introduced in the process adds a strengthening agent to the fiber, thus enhancing its performance through fiberization and downstream applications. (3) If fabric finishes have not been eradicated during the cleaning technique in the fiberization process, the probability exists that residual finishes will promote streaking or barring when the fabric is dyed, which is unacceptable in the manufacture of quality knits, woven's or non-woven for the marketplace. (4) Fabric cleaning advances a gentler fiberization process resulting in minimal dust in the ambient air and less short fiber content in the actual product.

Once the fabric pieces are cleaned, a spiked apron will retrieve the cleaned fabric pieces from the end of the box and pneumatically deliver it using a negative pressure system into a vertical transfer unit so that a cross section of the material will be a harmonious blend of material delivered to the next process stage of fabric deconstruction and pre-fiberization.

The materials are now air conveyed by suction to an inline feed box to prepare for the deconstruction/pre-fiberization stage of the process. It is important to note that in preferred embodiments fans are never used to blow the material from place to place, which creates knotting ("neps") in fiber and results in a lower quality end product. Only the use of a negative pressure transport system, in this case suction and/or vacuum, is considered an acceptable conveyance with regard to moving material from one process to another.

The cleaned fabric pieces are then subjected to gradual deconstructing process to obtain soft yarns (for fabrics) or fiber tufts (for nonwoven materials). It is important to understand that textiles are manufactured from a long list of different types of fibers such as: acetate, alginate, lyocell, modal, cotton, triacetate, cupro, viscose, elastane, hemp, linen, jute, flax, kapok, kenaf, raffia, pina, sisal, modacryllic, modal, novalid, nylon, acrylic, polyester, metallized polyester, polyurethane elastomere, ramie, silk sisal, triacetate, textile residues/unspecified composition, vinyl, angora, beaver, vicuna, camel hair, llama, mohair, lambswool, wool, alpaca, cashmere, virgin wool, mohair wool, angora wool, yak, bamboo, banana, byssus, polylactic acid or polylactide, anidex, nytril, aramid, polyaramid, olefin, azlon, PBI, polyamide, chlorofibre, chiengora, qiviut, polyethylene, elastane, polypropylene, elasterell-P, elastodiene, elastoester, rubber, fluorofibre, saran, spandex, lastol, sulphor, lastril, vinyl, metal fibers, metallic, vinyon, modacrylic, luminex, lurex, soy protein fiber and milk protein fibers which are found in a plethora of blends and combinations. It is also important to understand the different types of weaves, knits and non-woven structures associated with each of these fabrics. Some fabrics are loosely constructed, thus a novice in the art of textiles would understand that a "cable knit" sweater would be less structured in its weave than a pair of jeans, but not as fine a weave as a man's dress shirt or a ladies' silk dress. The present invention's use of information regarding yarn count and weave/knit or non-woven structure is an important technological part of the process, which enables it to be accurate in creating the highest quality fiber possible.

To understand the distinct differences between rejuvenation technology and that of classic recycling, it is important to note the difference in the structure of textiles and the data that is crucial to the information systems in order to finalize decisions on which types of equipment will be used to optimize the process and create the best quality fiber for any desired application. Therefore, the compilation of appropriate data depends on weave/knit or non-woven structure and will be examined based on the following information: Woven fabrics could have weave patterns defined as denim, twill, oxford, satin, gabardine, jacquard, gauze, cut pile, chiffon/georgette/shantung, and rib or basket weave to name a few. Knits could either be circular or flat and non-wovens could be bonded by thermalbond, spunlace, airlaid or needlepunch applications.

Groupings here might look like the following:
Denim and Twill
Oxford, Gabardine
Cut Pile, Terry
Cotton Knits: 16S-24S
Cotton Knits: 30S and higher
Sheeting and Shirting fabrics
Non-Woven Fabrics: Spunlace/28G-60G
Non-Woven Fabrics: Needlepunch with no thermal binders
Non-Woven Fabrics: Needlepunch with thermal binders
Thermalbond fabrics
Spunbond fabrics Upon analyzing the data, fine gauge needle selections will be determined with which to deconstruct the fabric into yarn sections prior to fiber refinement. For example, a needle used to deconstruct denim fabric will be substantially different than one used to deconstruct fine silk or a cable knit sweater. To underscore, it is significant to realize that the present invention specifically determines the manner in which incoming waste fabrics will be managed and processed.

Again, textile fabric waste should no longer be lumped together and viewed indiscriminately as simply scrap for recycling with the goal of maximizing the value of the raw materials for our industrial community. For example, an analysis of fabrications should conclude that the same needle used for cotton should not be used on wool; likewise, the needle used on wool would not be used on nylon, etc. Ironically, that very approach has been the modus operandi of textile waste recyclers and the basis for their technology throughout the centuries. Thus all of their products were developed from "shoddy fibers" and, in some cases, were a blend of high levels of virgin fibers and shoddy. This type of manufacturing has been propagated in niche plants under the guise of producing "environmentally friendly" items using lower efficiency fibers which have never been able to meet "big box" consumer demands of quality or on-time performance. Moreover, the production profile of these manufacturers has been relegated to low quality products whose functions have typically been acoustical, insulative or simply padding. To reiterate, all waste should be not treated equally to maximize the value of the raw materials for our industrial community.

The gradual deconstruction process of the present invention requires fabric pieces to be consolidated into a Feed Hopper to build up enough volume to create a mat as low as one but as high as three inches inches×0.05 meters, or up to six meters wide, with an ideal width of 3 meters, as it moves onto a conveyor. The material is then fed through rubber grip rollers that hold the fabric in place while two rotary drums equipped with specialized needles and cooled by water, air or refrigerant, are used to penetrate the fabric and begin to deconstruct or slice it into small yarn sections. This action is predicated on the types of fabrics being deconstructed, whether woven or knit and their thread count, or non-woven. The cylinders containing these specialized needles rotate counter clockwise to maximize the amount of yarn sections that are able to be separated. A crucial issue in the successful process of this embodiment is that of material temperature control. Thus, the drums in the Fabric Deconstruction Group are consistently monitored for temperature and cooled by air, water or refrigerant relative to the nature of the raw material. High heat has been proven to denigrate fiber quality, yet in all other recycling and fiber regeneration embodiments, while heat is occasionally addressed and larger cylinders with steel teeth are built, they are still done so with metal "pins and lags" which are running at high velocity for increased productivity and are never temperature controlled. In the case of cotton, it begins to degrade and/or break at a temperature of 248° F. relative to the heat element alone, its mechanical manipulation notwithstanding. Polypropylene begins to melt at a temperature of 150° F. and if a fabric contains a low melt polyester, it can have a melt point of 110° F. or less. Therefore, the rotating drums must maintain an average temperature of 98° F. The cylinders are cooled in order to reduce heat buildup during rotation, thus keeping the surfaces cool so as not to tear, break, or otherwise damage any of the materials during the process. It cannot be overstated that in order to achieve a usable fiber in a high level application, strict attention must be paid its level of exposure to high temperature in the process. Gauges are installed on the cylinders to monitor and control their external temperatures and assure the correct adjustment in order to keep fiber stress to a minimum. While focusing on quality rejuvenated fibers it is important to understand that heat sensitivity is important in dealing with all types of fibers. Cotton fibers are sensitive to heat and will therefore break and create shorter fibers and/or dust in the process. Allowing excessive heat while separating cotton fabric into yarn pieces would be self-defeating in creating a quality end product. Should high temperatures be a factor in the rejuvenation of polypropylene fibers, polyester fibers or other heat sensitive fibers, they would fuse and result in poor performance and quality characteristics, along with production inefficiencies in downstream manufacturing, and hence in their particular consumer products.

The resultant yarn and fabric pieces will then be transferred into Catalyzed Vapor Chamber No. 1 which will add catalyzed moisture to the material, thus strengthening the overall fiber for continuous deconstruction and pre-fiberization. In the initial Catalyzed Vapor Chamber, a catalyzed vapor is added to soften the fabric and relax the twist so that it begins to untwist naturally without fraying. Relative to the desired fiber application, the types of vapor employed in the Catalyzed Vapor Chamber could be, for example, a cellulase enzyme, a surfactant or a silicone treatment. The yarns will then be transferred by conveyor into a second section containing two cylinders with removable wooden racks of needles which rotate counter clockwise and are focused on the further deconstruction of the fabric pieces which had not been untwisted into yarn elements in the prior operation. Once again, this cylinder remains relatively cool and temperature controlled.

As the fabric is being deconstructed into yarn segments, it is placed back onto the mat and conveyed into Catalyzed Vapor Chamber No. 2. It is at this stage that an organic agent is injected into Catalyzed Vapor Chamber No. 2 in order to strengthen the yarn elements for further processing. The type of catalyzed vapor used here, for example, might be a surfactant in the case of deconstructing a cotton fabric. If rejuvenating a natural hair fabric like cashmere, a complex catalyzed vapor that includes a poly (vinylamine-vinylformamide) copolymer with a carrier which would improve the strength of fibers that might have been weakened as a result of mechanical stress would be the preferred option. If the situation called for polyester, nylon or polypropylene fiber to be deconstructed, a catalyzed vapor agent might be used in the CVC that would allow the fabric to carry less static through the remainder of the process.

During each stage, individual soft yarns are moved out of the process to the final stage prior to fiber refinement and the heavier fabric pieces are moved forward through the mechanical process until they have been deconstructed into soft yarn elements. If there are elements of fabric that are not properly separated into yarn segments during each stage of the process, they are re-deposited two stages back in the process, for example by means of monitoring the weight of the output of each stage of the process and removing the fabric pieces with heavier weight meaning that they are not yet deconstructed into yarn segments. If sufficient yarn separation has not occurred in the fourth stage of the process, the elements of fabric would be re-deposited into Catalyzed Vapor Chamber No. 2. Should the separation be inadequate in the third stage of the process, the elements of fabric would be re-deposited into the initial fiber feeder prior to the mat development so as to prevent any unnecessary fiber breakage after the fabric has been deconstructed. The mechanical process to untwist the fibers becomes more aggressive at this stage, thus it is important to strengthen the fibers so there is no degradation. The success of this technology depends on the maintenance of the length and the strength of the fibers at each stage of the process and this is best achieved by having a Stage Gate Process of mechanical, chemical and vapor processing. To emphasize, when working with cotton or other natural fibers, the addition of warm moisture penetrates the fabric and increases the strength of the fiber to ensure that it is not being weakened and creating additional breakage during the process.

A mat of yarn segments coming out of Catalyzed Vapor Chamber No. 2 is positioned once again on a conveyor. The opened yarn moves into the enclosed chamber where a third set of dual rotary drums which are equipped with industrial needles and turning counter clockwise will similarly be used to further promote the deconstruction of the fabrics. As the yarn is being exposed, the fabric that has not been deconstructed is being reconfigured into a mat and conveyed to Catalyzed Vapor Chamber No. 3 to further relax and promote continuous deconstruction from its yarn state in the fabric.

The material then proceeds down the conveyor through a chamber to a semi-final drum covered with knife-like needles which will continue to delicately deconstruct the fabric pieces. The soft yarns are finally taken through Catalyzed Vapor Chamber No. 4, then through a final dual drum covered with knife-like needles which will finalize the deconstruction of the fabric pieces into soft yarn prior to Fiber Refinement. There are a number of catalyzed vapors that can be used based on downstream process requirements. However, if the downstream fibers are to be used in a medical or pharmaceutical grade product, an anti-microbial application or a biocide could begin to be administered at this stage.

It should be noted that the Catalyzed Vapor Chambers serve different purposes for each section and each type of fabric that is being presented. For example, cotton requires the addition of moisture along with a softener to its fiber at this stage. A catalyzed silicone vapor could be one of the many selections used for cotton in this case such as Softycon's SHP-C, Sofytcon's TRN or Rexamine CP 9194 AL. Other choices could be cellulase enzymes, surfactants or other silicone softening treatments. The ideal addition of moisture throughout the process of deconstruction will be 7% to 20% with the average being approximately 14%. If cotton is ever allowed to become dry, hot or brittle in the process of deconstruction the fibers will break. If the fibers break or become frayed during deconstruction their quality will be compromised downstream. Therefore, throughout the deconstruction and refining process it is important to add humidity to the material/yarn/fibers and maintain temperature control in order to eliminate short fibers and dust, which comes from dry or mechanically abused fiber. In the case of rayon fabrics, the catalyzed softener could be a blend of a non-ionic softener such as alkyl polyethanoxyether or polyoxyethylene alkyl ether, however, the application of water is not as critical here. Products which have proven to be successful as part of the catalyzed vapor technology for these fabrics have been Perrustol CCF, Perrustol CCA or Softycon's RWT. The temperature of the Catalytic Vapor within the units can range from 100° C. to 200° C., dependent on the application. At this stage in the production of synthetics such as polyester, polypropylene or nylon, cool mist vapor is utilized with the softening agent incorporating wick or ultrasonic technology to reduce the static electricity associated with these fabrics.

Having now conditioned the materials to a soft yarn state, it is necessary to individualize the fibers by taking them through the final stage in order to use them as a replacement for virgin fibers with no loss of efficiency in production speed or quality. The fiber refinement process developed in this technology takes the soft yarn segments and places them into individual fibers. Additionally, fibers are segregated at this point into different lengths with longer going into high count yarns, medium length fibers into medium count yarns and high speed non-wovens, and the shorter of these fibers going into course count yarns and lower speed non-wovens. The dust, or shorter fibers less than W, are secured for wet laid processing. The fiber refinement process further removes neps (fiber bundles) that are created through handling during processing.

The refinement process begins by taking the unrefined fiber from the final stage of Fabric Deconstruction/prefiberization where it is layered and staged in a large blending box, which is important to the harmonious blending of the fiber for downstream processing. This procedure creates fiber parallelization resulting in quality equal, or superior, to that of virgin in both the actual fiber and its processability. A critical factor in the successful processing of these types of fibers is to ensure that they are never blown from successive procedures, but are rather transported by suction in order to reduce neps. Fibers are sent to a Feed Hopper where they are contained until the production line requires the sequential release of material. In prior art, textile-carding equipment is commonly utilized. However, it has been proven that the use of traditional textile carding equipment is not ideal for individual fiberization. Traditional carding equipment is primarily built to clean virgin cotton or other plant based fibers which contain dirt and trash by utilizing heavy gauged steel teeth or "lickerins," etc. and then create a "card sliver," which is then spun into yarn. While the final refined fiber resulting from this technology will be made available to many downstream products such as quality textile yarn, the use of this type of carding equipment to refine fibers is not preferable within this method's protocol. In our experience, the use of heavy gauged teeth creates additional breakage which results in a loss of critical fiber that is important to the overall product mix. We do not find this technology to be successful in creating consistent quality fiber for downstream applications. The equipment described in those embodiments could be used to create yarn in textile mills, but not to create a consistent quality rejuvenated textile fiber.

A new approach to Fiber Refinement became necessary when years of process research and production led to the conclusion that while fiber of adequate quality was indeed being created using traditional carding machinery, fiber breakage remained a source of frustration. This was discovered when making application for U.S. Ser. No. 12/605,341. Carding is created to clean cotton that has significant trash, leaves, and stems coming from the cotton fields. The equipment in itself created neps, short fiber and even if short fiber wasn't created it weakened the fiber overall. Others have continued to use carding alone as their only source of rejuvenation of fiber. Fiber fibrillization constituted a negative outcome and the significant loss of good fiber was problematic since the equipment itself was originally employed to remove trash, stems, leaves and other debris from fibrous materials in the early stages of carding. While the use of traditional carding equipment was good for organic fibers such as cotton in the spinning process, it was inadequate for rejuvenating fiber. It became necessary to develop a solid solution for cotton, polyester, polypropylene fibers, silk, bamboo or other specialty fibers that are all plentiful in the rejuvenation marketplace and need attention to quality. Therefore, we resolutely abandoned a portion of our previous art and forged ahead in researching a solution to the dilemma of refining high-level fibers that would flourish in quality products and maintain their efficiency throughout downstream processing.

As the new process begins and fibers are properly untwisted from their yarn state and appropriately integrated to yield as much randomness in the blend of materials as possible, it becomes time to individualize the fibers and bale them for downstream processing. The fibers are moved from the blending area by conveyor into the system pass automated metal detection, and then conveyed through the fiber conditioner during the initial stage of the process. With some fibers this step serves to eliminate static, especially in the case of blended fibers such as polyester/cotton or perhaps polyester/rayon. In some of the rejuvenated fibers such as cotton, this step strengthens and increases moisture that may have been lost in the system. It is also important in the case of cotton to add a conditioner to help reduce the neps that can occur with mechanical handling. With fibers such as PLA or Bamboo, it has been important to add an agent to allow it to "glide" through the refinement process. There are many processing aids that are used and these are examples of those associated with a few types of fibers. The utilization of a unique processing aid is predicated on each fiber type that has been identified in the list of fibers that can be rejuvenated. The fiber is then delivered onto a gauged wire main cylinder by a gauged wire feeding roll where it is combed much like hair is combed, first from the top and then underneath. As the fibers continue to their specific series of finely gauged wired rolls, it is important to understand the difference in the wire function and each type of roll necessary to refine the unique types of fiber being delivered. A cotton wire will be gauged much differently than a polyester synthetic wire, and wire that will refine a jute or raffia fiber will be more unique than a wire that will refine a bamboo fiber. Therefore, each refining unit has distinct individual settings for speed and wired rolls. These rolls comb the fibers both from the top and underneath, similar to strokes employed in the brushing of human hair. This process will parallelize and actually stretch the fibers to their optimum length as well as remove any shorter fibers that may have formed and move them to the appropriate areas for downstream production.

The fibers are then evacuated from the Fiber Refining Units by a vacuum system into their appropriate balers. Considering the meticulous care with which the raw materials, as well as each fiber and yarn segment, are being handled throughout the overall process, there remain three different lengths of fiber that will be naturally produced during rejuvenation. The categorization of those fibers constitute short, which are 6 mm or less, and both medium and long, whose qualification is dependent upon the types of raw materials being deconstructed. These fibers are captured throughout the system, but especially in the Fiber Refinement Section and are baled to be used in downstream products accordingly. This dynamic is part of the value system of rejuvenation. If only 70% of the fibers can be utilized, then the cost of rejuvenation is 30% higher for the fiber that is being used. When all the fiber can be used, the cost of rejuvenation can be spread across 100% of the production costs and can create a 100% sustainable product.

The fibers will subsequently be delivered to the next stage of combing where they will be combed on both top and underneath to further individualize them. The final step and one of the critical steps of the purification of the fiber process is that a very thin web of fiber is exposed to the UVC Chamber where the entire fiber web is exposed for complete purification and disinfection of the fibers. Lastly, the fibers will be suctioned from the wire pneumatically, using a negative pressure system and sent to a baler having passed through final metal detection in preparation for their downstream processing.

In certain circumstances, it may be necessary to blend other fibers with the fabric pieces, soft yarns and/or fiber tufts obtained above to produce target product. In such cases, ratio of the other fibers blended with the fabric pieces, soft yarns and/or fiber tufts is between 2/98 and 99/1. These rejuvenated fibrous materials may also be converted to a composite material.

The rejuvenated fibrous material obtained above may be subject to various further processing, examples of which may include the following:

The rejuvenated fibrous material may be spun into threads or yarns, and the threads or yarns may then be weaved into woven fabrics, or knitted into fabrics, rope or cable, cord, trim, fringe, or braids.

The rejuvenated fibrous material may also be converted into spunlaced nonwoven fabric, needlepunch nonwoven fabric, thermalbond nonwoven fabric, carded bond nonwoven fabric, spunbond nonwoven fabric or airlaid nonwoven fabric, and such fabric may then be further converted into personal care, cosmetic, baby, medical, filtration, geotextile or other industrial products.

The present invention may also provide a system of method of processing waste fabrics to rejuvenated fibrous materials, comprising:

(a) means for obtaining fabric data for each bale of incoming waste fabrics;

(b) means for obtaining target data relating to target product requirements;

(c) means for processing the fabric data stored in the database and the target data to generate a rejuvenation processing recipe which specifies bales information relating to bales of incoming waste fabrics selected for further rejuvenation processing, and rejuvenation processes information relating to a series of processes and corresponding process parameters for each of the series of processes for processing the selected bales of incoming waste fabrics to obtain rejuvenated fibrous materials specific to the target product requirements.

According to the above disclosure, a person skilled in the art may make suitable modifications and changes to the above embodiments. Therefore, the present invention is not limited by the above disclosure and the embodiment described. Modifications and changes to the present invention should fall within the scope of the present invention as defined by the claims. Besides, although certain technical terms have been used throughout the specification, the technical terms are intended for ease of explanation and are not intended to restrict the present invention in any ways.

The invention claimed is:

1. A method of processing waste fabrics to rejuvenated fibrous materials, comprising the steps of:
   (a) Obtaining fabric data for each bale of incoming waste fabrics by conducting a Fourier Transform Infrared spectroscopy test to the incoming waste fabric, and storing the fabric data in a database, wherein the fabric data is selected from the group consisting of the composition of the incoming waste fabric, the approximate yarn count of the incoming waste fabric, the types of treatments or finishes that the incoming waste fabric has received during production of the incoming waste fabric, and the color and shade of the incoming waste fabric;
   (b) Obtaining target data relating to target product requirements, wherein the target data is selected from the group consisting of fabric composition, yarn count, color, shade, chemical finishes and fabric finishes;
   (c) Processing the fabric data stored in the database and the target data according to predetermined algorithms, which algorithms generate a rejuvenation processing recipe which specifies bales information relating to bales of incoming waste fabrics selected for further rejuvenation processing, and rejuvenation processes information relating to one or more process steps, and process parameters corresponding to said one or more process steps, for processing the selected bales of incoming waste fabrics to obtain rejuvenated fibrous materials specific to the target product requirements;
   (d) Selecting, according to the bales information of the rejuvenation processing recipe, corresponding bales of incoming waste fabrics for further rejuvenation processing;
   (e) Subjecting the selected bales of incoming waste fabrics to processes specified by the rejuvenation processes information of the rejuvenation processing recipe.

2. The method of claim 1, wherein the process comprise:
   (e1) opening and simultaneously blending the selected bales of incoming waste fabrics to obtain initially opened and blended fabric pieces;
   (e2) cleaning the initially opened and blended fabric pieces to obtain cleaned fabric pieces;
   (e3) subjecting the cleaned fabric pieces to a deconstructing process to obtain soft yarns or fiber tufts;
   (e4) blending the soft yarns or fiber tufts;
   (e5) subjecting the blended soft yarns or fiber tufts to fiber conditioning and parallelization to obtain refined fibers;
   (e6) extracting the refined fibers of all lengths for final baling of fibers.

3. The method of claim 1, wherein the bales of incoming waste fabrics contain fibers including one or a blend of the following: natural fibers from plant or vegetable, animal hairs, metallic fibers, fibers transformed from natural polymers, synthetic fibers, inorganic fibers.

4. The method of claim 3, wherein the natural fibers from plant or vegetable include cotton, kapok, kupro, flax, linen, hemp, jute, ramie, kenaff, straw, banan, pina, papyrus, alfagras, fique, alginate, urena, nettle, broom, apocynum, raffia, bamboo, sisal, abaca, henequen, phormium, rosella, acacia, aloe, yucca, coconut, and elastodiene.

5. The method of claim 3, wherein the animal hairs include wool, camel, vicuna, alpaca, llama, mohair, cashmere, horse hair, goat hair, rabbit hair, yak, beaver, chitosan, silk, chiengora, and qiviut.

6. The method of claim 3, wherein the metallic fibers include gold, silver, aluminized yarns or aluminized plastic yarns.

7. The method of claim 3, wherein the fibers transformed from natural polymers include viscose, bamboo (regenerated), modal, lyocell, acetate, triacetate, milk protein, PLA (polylactic acid), and byssus.

8. The method of claim 3, wherein the synthetic fibers include polyamides, polyesters, polyurethanes, polyvinyls, polyolefins, polypropylene, copolymers, elastomeric fibers, modacrylics, aramid, paramids, and PBI (polybenzimidazole).

9. The method of claim 3, wherein the inorganic fibers include as glass fiber, silicic acid glass, carbon, ceramic, steel, copper and basalt.

10. The method of claim 1, wherein the incoming waste fabrics are post-industrial waste fabrics which are sorted preliminarily by fabric color and fabric type.

11. The method of claim 1, wherein Step (a) comprises conducting additional laboratory tests to the incoming waste fabrics; the laboratory tests include one or more of the following: burn test, solubility test, dye staining test, chemical reaction test, burn rate test, elemental analysis, color and shade test, UV spectroscopy imaging and detection.

12. The method of claim 1, wherein after Step (a) the bales of incoming waste fabrics are sorted into batches according to the obtained fabric data.

13. The method of claim 2, wherein before Step (e2), the initially opened and blended fabric pieces are reduced to a size of approximately six to fourteen inches long or six to fourteen inches square for conforming to downstream production equipment, and thereafter blended to avoid segregation and to unify composition of the fabric pieces.

14. The method of claim 2, wherein Step (e2) comprises:
   (e2.1) removing one or more of dust, pattern markers, trash, threads and paper from the initially opened and blended fabric pieces;
   (e2.2) further reducing the size of the initially opened and blended fabric pieces;
   (e2.3) subjecting the fabric pieces to an initial fabric deconstruction process where surfaces of the fabric pieces are penetrated by sleeves of industrial needles;
   (e2.4) blending the initially deconstructed fabric pieces;
   (e2.5) subjecting the blended fabric pieces to cleaning process to remove fabric finishes.

15. The method of claim 14, wherein the initially opened and blended fabric pieces are reduced to a size of approximately six to fourteen inches long or six to fourteen inches square.

16. The method of claim 14, wherein before Step (e2.2), using UV light to detect foreign chemicals selected from the group consisting of optical brighteners, traces of synthetics and color contaminants and removing fabric pieces detected with foreign chemicals.

17. The method of claim 14, wherein the initially opened and blended fabric pieces are further reduced to a size of approximately three to six inches square or a maximum length of six inches in Step (e2.2).

18. The method of claim 14, wherein Step (e2.4) further comprises:
(e2.4.1) carrying the initially deconstructed fabric pieces by means of a delivery condenser and positioning over a large blending box;
(e2.4.2) moving the delivery condenser from right to left over the large blending box and simultaneously dropping the initially deconstructed fabric pieces onto floor of the large blending box in a z-type pattern until the floor has been covered by fabric pieces;
(e2.4.3) repeating step (e2.4.2) until the large blending box has been filled;
(e2.4.4) retrieving the fabric pieces from an end cap of the large blending box by means of a spiked apron;
(e2.4.5) pneumatically delivering the retrieved fabric pieces using a negative pressure system into a vertical transfer unit.

19. The method of claim 14, wherein the process parameters for the cleaning process include one or more of the following: preparations for applying to the blended fabric pieces, amount of preparations for applying to the blended fabric pieces, period of time for the cleaning process, temperature for the cleaning process.

20. The method of claim 19, wherein the preparations for applying to the blended fabric pieces include one or more of the following: enzymes, organic finish removers.

21. The method of claim 19, wherein the fabric finishes to be removed include one or more of the following: starches, silicone finishes, fabric softeners, repellents, flame retardants, permanent press finishes, foamers, defoamers and soil releasing agents.

22. The method of claim 14, wherein in Step (e2.5) the fabric finishes are removed by a semidry method wherein organic formulations containing enzymes and/or other organic chemicals for removing starches, silicone finishes, fabric softeners, repellents, flame retardants, permanent press finishes, foamers, defoamers, soil release agents and so forth are applied to the fabric pieces in form of vapor and/or spray in such a way that moisture content in the fabric pieces at this stage would not exceed 20%; and as the fabric pieces pass through the rest of the process, the end result of moisture never exceeds 12% throughout the overall manufacturing process.

23. The method of claim 2, wherein the deconstructing process includes a series of alternate deconstruction and conditioning treatments to deconstruct fabrics pieces to soft yarns or non-woven material to fiber tufts.

24. The method of claim 2, wherein the deconstructing process comprises:
(e3.2.1) subjecting the cleaned fabric pieces to a feed hopper to create a mat;
(e3.2.2) feeding the mat by means of a rubber grip roller to a first set of single or dual rotary cylinders equipped with needles and cooled by water, air or refrigerant to obtain yarn segments and remaining fabric pieces;
(e3.2.3) subjecting the yarn segments and remaining fabric pieces to one or more treatments selected from the group consisting of cellulase enzyme, surfactant, softeners, antimicrobials, and silicone finishes;
(e3.2.4) subjecting the yarn segments and remaining fabric pieces to a second set of rotary cylinders with needles and cooled by water, air or refrigerant for further deconstruction to obtain yarn segments and remaining fabric pieces;
(e3.2.5) subjecting the yarn segments and remaining fabric pieces to treatment with a surfactant, a poly (vinylamine-vinylformamide) copolymer, an anti-static agent, or combinations thereof.

25. The method of claim 24, wherein gauges are installed on the rotary cylinders to monitor and control their external temperatures.

26. The method of claim 24, wherein the treatments in Step (e3.2.3) include one or more components selected from the group consisting of cellulose enzyme, antimicrobials, softeners, surfactant and silicone.

27. The method of claim 24, wherein during each stage of the gradual deconstructing process, elements of fabric that are not properly separated into yarn segments are redeposited two stages back in the process.

28. The method of claim 2, wherein step (e5) comprises:
(e5.1) combing the soft yarn or fiber tufts using wired rolls to parallelize and stretch the soft yarns; and
(e5.2) applying finishes to the soft yarns or fiber tufts.

29. The method of claim 28, wherein the finishes are selected from the group consisting of flame retardants, soil release, and antibacterial finishes.

30. The method of claim 2, wherein fabric pieces, soft yarns and/or fiber tufts are transported by means of a negative pressure transport system from one process to another.

31. The method of claim 2, wherein it further comprises blending other fibers with the fabric pieces, soft yarns and/or fiber tufts.

32. The method of claim 31, wherein ratio of the other fibers blended with the fabric pieces, soft yarns and/or fiber tufts is between 2/98 and 99/1.

33. The method of claim 1, wherein it further comprises spinning the rejuvenated fibrous materials into a thread or yarn.

34. The method of claim 33, wherein it further comprises weaving the thread or yarn into a woven fabric.

35. The method of claim 33, wherein it further comprises knitting the thread or yarn into a fabric.

36. The method of claim 33, wherein it further comprises knitting the thread or yarn into a rope or cable, cord, trim, fringe, or braids.

37. The method of claim 1, wherein it further comprises converting the rejuvenated fibrous materials into a spunlaced nonwoven fabric.

38. The method of claim 37, wherein it further comprises converting the spun laced nonwoven fabric into a personal care, cosmetic, baby, medical, filtration, geotextile or other industrial product.

39. The method of claim 1, wherein it further comprises converting the rejuvenated fibrous materials into a needlepunch nonwoven fabric.

40. The method of claim 39, wherein it further comprises converting the needlepunch nonwoven fabric into a personal care, cosmetic, baby, medical, filtration, geotextile, or other industrial product.

41. The method of claim 1, wherein it further comprises converting the rejuvenated fibrous materials into a thermal-bond nonwoven fabric.

42. The method of claim 41, wherein it further comprises converting the thermal bond nonwoven fabric into a personal care, cosmetic, baby, medical, filtration, geotextile, or other industrial product.

43. The method of claim 1, wherein it further comprises converting the rejuvenated fibrous materials into a carded bond nonwoven fabric.

44. The method of claim 43, wherein it further comprises converting the carded bond nonwoven fabric into a personal care, cosmetic, baby, medical, filtration, geotextile, or other industrial product.

45. The method of claim 1, wherein it further comprises converting the rejuvenated fibrous materials into a spunbond nonwoven fabric.

46. The method of claim 45, wherein it further comprises converting the spunbond nonwoven fabric into a personal care, cosmetic, baby, medical, filtration, geotextile, or other industrial product.

47. The method of claim 1, wherein it further comprises converting the rejuvenated fibrous materials into an airlaid nonwoven fabric.

48. The method of claim 47, wherein it further comprises converting the airlaid non-woven fabric into a personal care, cosmetic, baby, medical, filtration, geotextile, or other industrial product.

49. The method of claim 1, wherein it further comprises converting the rejuvenated fibrous materials into a composite material.

\* \* \* \* \*